United States Patent
Di Nicolo'

(10) Patent No.: US 12,064,731 B2
(45) Date of Patent: Aug. 20, 2024

(54) POROUS MEMBRANES FOR HIGH PRESSURE FILTRATION

(71) Applicant: SOLVAY SPECIALTY POLYMERS USA, LLC, Alpharetta, GA (US)

(72) Inventor: Emanuele Di Nicolo', Gorla Minore (IT)

(73) Assignee: SOLVAY SPECIALTY POLYMERS USA, LLC, Alpharetta, GA (US)

(*) Notice: Subject to any disclaimer, the term of this patent is extended or adjusted under 35 U.S.C. 154(b) by 544 days.

(21) Appl. No.: 17/414,361

(22) PCT Filed: Dec. 18, 2019

(86) PCT No.: PCT/EP2019/085902
§ 371 (c)(1),
(2) Date: Jun. 16, 2021

(87) PCT Pub. No.: WO2020/127454
PCT Pub. Date: Jun. 25, 2020

(65) Prior Publication Data
US 2022/0040646 A1  Feb. 10, 2022

(30) Foreign Application Priority Data

Dec. 20, 2018  (EP) .................................. 18214560

(51) Int. Cl.
| | | |
|---|---|---|
| *B01D 67/00* | (2006.01) | |
| *B01D 61/02* | (2006.01) | |
| *B01D 69/02* | (2006.01) | |
| *B01D 69/06* | (2006.01) | |
| *B01D 69/08* | (2006.01) | |
| *B01D 69/12* | (2006.01) | |
| *B01D 71/52* | (2006.01) | |
| *B01D 71/56* | (2006.01) | |
| *B01D 71/72* | (2006.01) | |
| *C02F 1/44* | (2023.01) | |
| *C08G 61/10* | (2006.01) | |
| *C08G 61/12* | (2006.01) | |
| *C08J 5/18* | (2006.01) | |
| *C08J 9/00* | (2006.01) | |
| *C08J 9/28* | (2006.01) | |
| *C08L 65/02* | (2006.01) | |
| *C02F 103/08* | (2006.01) | |

(52) U.S. Cl.
CPC ........ *B01D 67/0011* (2013.01); *B01D 61/025* (2013.01); *B01D 67/002* (2013.01); *B01D 69/02* (2013.01); *B01D 69/06* (2013.01); *B01D 69/08* (2013.01); *B01D 69/1216* (2022.08); *B01D 71/5223* (2022.08); *B01D 71/56* (2013.01); *B01D 71/72* (2013.01); *C02F 1/441* (2013.01); *C08G 61/10* (2013.01); *C08G 61/12* (2013.01); *C08J 5/18* (2013.01); *C08J 9/0061* (2013.01); *C08J 9/283* (2013.01); *C08L 65/02* (2013.01); *B01D 2323/12* (2013.01); *B01D 2325/02* (2013.01); *B01D 2325/0283* (2022.08); *B01D 2325/02832* (2022.08); *B01D 2325/02833* (2022.08); *B01D 2325/02834* (2022.08); *B01D 2325/24* (2013.01); *C02F 2103/08* (2013.01); *C08G 2261/1426* (2013.01); *C08G 2261/312* (2013.01); *C08G 2261/516* (2013.01); *C08J 2201/0544* (2013.01); *C08J 2339/06* (2013.01); *C08J 2365/02* (2013.01)

(58) Field of Classification Search
CPC .... B01D 71/72; B01D 61/025; B01D 67/002; B01D 69/02; B01D 69/06; B01D 69/08; B01D 69/12; B01D 71/5223; B01D 71/56; B01D 67/0011; B01D 2323/12; B01D 2325/02; B01D 2325/24; C02F 1/441; C02F 2103/08; C08G 61/10; C08G 61/12; C08G 2261/1426; C08G 2261/312; C08G 2261/516; C08J 5/18; C08J 9/0061; C08J 9/283; C08J 2201/0544; C08J 2339/06; C08J 2365/02; C08L 65/02
USPC ....................................................... 210/654
See application file for complete search history.

(56) References Cited

U.S. PATENT DOCUMENTS

| | | | |
|---|---|---|---|
| 4,038,351 | A | 7/1977 | Koenst, Jr. et al. |
| 4,039,440 | A | 8/1977 | Cadotte |
| 5,250,185 | A | 10/1993 | Tao et al. |
| 5,646,231 | A | 7/1997 | Marrocco, III et al. |
| 5,654,392 | A | 8/1997 | Marrocco, III et al. |
| 7,301,002 | B1 | 11/2007 | Cornelius et al. |
| 7,868,124 | B2 | 1/2011 | Balland-Longeau et al. |
| 7,888,397 | B1 | 2/2011 | Hibbs et al. |
| 7,906,608 | B2 | 3/2011 | Higami et al. |
| 8,177,978 | B2 | 5/2012 | Kurth et al. |

(Continued)

FOREIGN PATENT DOCUMENTS

| | | |
|---|---|---|
| EP | 1994094 A2 | 11/2008 |
| EP | 1858977 B1 | 6/2009 |

(Continued)

OTHER PUBLICATIONS

Songhan Plastic Technology Co., Ltd., Solvay Specialty Polymers PrimoSpireÂ® PR-250 Polyphenylene, Self-Reinforced (SRP), p. 1-3, Publication Date Unknown.*

(Continued)

*Primary Examiner* — Fred Prince
(74) *Attorney, Agent, or Firm* — Osha Bergman Watanabe & Burton LLP

(57) ABSTRACT

The present invention relates to a porous membrane suitable for use in high pressure filtration method.

15 Claims, No Drawings

(56) References Cited

U.S. PATENT DOCUMENTS

| | | | | |
|---|---|---|---|---|
| 2010/0313752 A1* | 12/2010 | Powell | ............... | B01D 53/228 |
| | | | | 521/154 |
| 2011/0031176 A1* | 2/2011 | Knappe | ............... | B01D 63/00 |
| | | | | 210/321.87 |
| 2012/0031833 A1* | 2/2012 | Ho | ............... | B01D 71/70 |
| | | | | 210/488 |
| 2019/0009224 A1* | 1/2019 | Di Nicolo' | ............ | B01D 61/14 |

FOREIGN PATENT DOCUMENTS

| | | | |
|---|---|---|---|
| JP | 2018-187533 A | * | 11/2018 |
| WO | 9628491 A1 | | 9/1996 |
| WO | 2007101858 A2 | | 9/2007 |
| WO | 2008116837 A2 | | 10/2008 |
| WO | 2018065526 A1 | | 4/2018 |

OTHER PUBLICATIONS

Machine-generated English translation of JP 2018-187533, generated on Dec. 5, 20223.*

Pendergast M. T. M. et al., "Using nanocomposite materials technology to understand and control reverse osmosis membrane compaction", Desalination, 2010, vol. 261, pp. 255-263, DOI: 10.1016/j.desal.2010.06.008—Elsevier B.V.

Shi Q. et al., "Poly(p-phenylene terephthalamide) embedded in a polysulfone as the substrate for improving compaction resistance and adhesion of a thin film composite polyamide membrane", J. Mater. Chem. A, 2017, vol. 5, pp. 13610-13624, DOI: 10.1039/C7TA02552A—The Royal Society of Chemistry.

Porter M.C., "Pore size determination", in Handbook of Industrial Membrane Technology, 1990, p. 70-78—Noyes Publications.

Smolders, K. et al., "Terminology for membrane distillation", Desalination, 1989, vol. 72, pp. 249-262, XP000177921, DOI: 10.1016/0011-9164(89)80010-4—Elsevier Science Publishers B.V. Amsterdam.

Standard ASTM D638—Standard Test Method for Tensile Properties of Plastics, 2003, p. 1-15.

Solvay Advanced Polymers, "Preliminarly Data PrimoSpireTM PR-250 self-reinforced polyphenylene", Internet Citation, 2006, XP002462949, Retrieved from the Internet <URL:http://www.solvayadvancedpolymers.com/static/wma/pdf/8/0/4/6/Primospire_PR250.pdf> [retrieved on Dec. 19, 2007].

Solvay Advanced Polymers, "PrimoSpireTM Self-Reinforced Polyphenylene" "More Remarkable Strength and Stiffness than any unfilled Plastic", Internet Citation, Oct. 24, 2007 (Oct. 24, 2007), XP002462948, Retrieved from the Internet <URL:http://www.solvayadvancedpolymers.com/products/bybrand/parmax/0,,38808-2-0,00.htm> [retrieved on Dec. 19, 2007].

Ghassemi H. et al., "Synthesis and properties of new sulfonated poly(p-phenylene) derivatives for proton exchange membranes. I", Polymer, 2004, vol. 45(17), p. 5847-5854—Elsevier Ltd.

Lim Y. et al., "Studies of sulfonated polyphenylene membranes containing benzophenone moiety for PEMFC", International Journal of Hydrogen Energy, 2014, vol. 39(36), p. 21595-21600—Elsevier Ltd.

Zhang X. et al., "Polyphenylenes and the related copolymer membranes for electrochemical device applications", Polymer Chemistry, 2014, vol. 5(21), p. 6121-6141—The Royal Society of Chemistry.

Hossain MD. A. et al., "Comparison of properties of anion conductive Parmax membranes containing imidazolium cation and quaternary ammonium", International Journal of Hydrogen Energy, 2015, vol. 40(2), p. 1324-1332—Elsevier Ltd.

* cited by examiner

POROUS MEMBRANES FOR HIGH PRESSURE FILTRATION

CROSS-RELATED REFERENCE

This application is a U.S. national stage entry under 35 U.S.C. § 371 of international patent application No. PCT/EP2019/085902 filed on Dec. 18, 2019, which claims priority to European patent application No. 18214560.7, filed on Dec. 20, 2018, the whole content of this applications being explicitly incorporated herein by reference.

Technical Field

The present invention relates to a porous membrane suitable for use in high pressure filtration method.

Background Art

Porous membranes are discrete, thin interface that moderate the permeation of chemical species in contact with them. The key property of porous membranes is their ability to control the permeation rate of chemical species through the membrane itself. This feature is exploited in many different applications like separation applications (water and gas) or drug delivery applications.

Aromatic polymers (such as polysulphones and polyethersulphone), partially fluorinated polymers (such as polyvinylidene fluoride) and polyamides are widely used in the preparation of microfiltration and ultrafiltration membranes due to their good mechanical strength and thermal stability.

Polymeric membranes suitable for use as microfiltration and ultrafiltration typically control the permeation under a "sieve" mechanism since the passage of liquid or gas is mainly governed by a convective flux. Such polymeric membranes are mainly produced by phase inversion methods which can give raise to items with very large fraction of voids (porosity).

A homogeneous polymeric solution (also referred to as "dope solution") containing a polymer, a suitable solvent and/or a co-solvent and, optionally, one or more additives is typically processed by casting into a film and then brought to precipitation by contacting it with a non-solvent medium by the so-called Non-Solvent Induced Phase Separation (NIPS) process. The non-solvent medium is usually water or a mixture of water and surfactants, alcohols and/or the solvent itself.

Precipitation can also be obtained by decreasing the temperature of the polymeric solution by the so-called Thermal Induced Phase Separation (TIPS) process.

Alternatively, the precipitation may be induced by contacting the film processed by casting with air at a very high water vapour content by the so-called Vapour Induced Phase Separation (VIPS) process.

Still, the precipitation may be induced by evaporation of the solvent from the film processed by casting by the so-called Evaporation Induced Phase Separation (EIPS) process. Typically in this process an organic solvent with low boiling point (such as THF, acetone, MEK and the like) is used in admixture with water (the so called "non-solvent"). The polymer solution is first extruded and then precipitates due to the evaporation of the volatile solvent and the enrichment of the non-solvent.

The above processes can be used in combination and/or in sequence to provide membranes having specific morphology and performances. For example, EIPS process can be combined with the VIPS process and NIPS process in order to complete the coagulation process.

The EIPS process is known as "thermal coagulation process" when polyurethane polymers are used to manufacture porous membranes. In this case, the dope solution is prepared with a pre-polymer and as the membrane is formed, it is stabilized with a thermal post treatment to fix the porous structure and crosslink the pre-polymer.

In addition, stretching (either during or after the coagulation process) under heating is a way known in the art to increase the porosity and the pore size.

The use of porous membranes, notably in the form of thin film composite (TFC), for the separation of liquid or gases in reverse osmosis or ultrafiltration processes is well known.

Reverse osmosis has attracted considerable interest in the field of purification of saline water. In this process, high pressure saline water may be placed in contact with a semipermeable membrane (typically made from a polyamide layer), which is permeable to water but relatively impermeable to salt. Concentrated brine and relatively pure water are separated thereby; the relatively pure water may then be utilized for personal use such as drinking, cooking, etc., while the brine may be discarded.

In addition, TFC membranes may also be utilized for the separation of various gases. The separation of a gas mixture utilizing a membrane is effected by passing a feed stream of the gas across the surface of the membrane. Since the feed stream is at an elevated pressure relative to the effluent stream, a more permeable component of the mixture will pass through the membrane at a more rapid rate than will a less permeable component. Therefore, the permeate stream which passes through the membrane is enriched in the more permeable component while, conversely, the residue stream is enriched in the less permeable component of the feed.

Efficiency of the reverse osmosis process depends to a large extent on the nature of the membrane and numerous types of membranes from several kind of polymers, and methods of preparing them have been described in the prior art, for example in U.S. Pat. No. 4,039,440 (U.S.A. DEPARTMENT OF THE INTERIOR), in U.S. Pat. No. 8,177,978 (NANOH20, INC.) and in U.S. Pat. No. 5,250,185 (TEXACO INC.).

However, the Applicant noted that membranes known in the art, when subjected to high operating pressures, tend to undergo compaction which then results in reduced permeate productivity after a period of time. The compaction of the membrane is due to the collapse of the relatively weak porous structure under pressure. Also, the unavoidable external surface fouling leads to increase the required feed pressure. The external fouling and the collapse of the porous structure inevitably contribute to modifying the membrane's macrovoid structure, by reducing the void volume and increasing the hydraulic resistance.

Reverse osmosis membranes may be fabricated including nanoparticles in the porous support membrane to release soluble metal ions for the interfacial polymerization process and/or improve flux flow decline by, perhaps, resisting compaction of the support membranes during reverse osmosis. Nanocomposite materials technology for the manufacture of reverse osmosis membrane were evaluated and discussed, for example, by PENDERGAST, Mary Theresa M., et al. Using nanocomposite materials technology to understand and control reverse osmosis membrane compaction. *Desalination.* 2010, vol. 261, p. 255-263.

However, the use of said nanoparticles is not desired because, on the one hand, they interfere with the phase-inversion process by modifying the viscosity of the dope solution and the coagulation process, such that after coagulation the membrane does not show a uniform distribution of particles. In addition, on the other hand, the risk of leaching exists, which provides for serious concerns from the regulatory point of view in terms of toxicological profile.

The manufacture of membranes and filters from compositions comprising aromatic polymers have been broadly disclosed in the art. For example, EP 1858977 B (SOLVAY ADVANCED POLYMERS LLC) broadly disclose a blend composition comprising polyphenylene and/or poly(aryl ether sulfone) for the preparation of articles, such as among the others membraned and filters.

The use of polymers comprising phenylene repeating units has been disclosed in the art for the manufacture of ion-exchange membranes, which are actually non-porous films. For example, U.S. Pat. No. 7,868,124 (COMMISSARIAT A L'ENERGIE ATOMIQUE) discloses polymers comprising phenylene units, at least one of which bears a phenylene side group substituted with a perfluoro group or chain, which itself bears a —$SO_3H$, —$PO_3H_2$ or —COOH group, and the use thereof to make fuel cell membranes. Also, U.S. Pat. No. 7,888,397 (SANDIA CORPORATION) discloses polyphenylene-based anion exchange membrane. U.S. Pat. No. 7,906,608 (JSR CORPORATION) discloses a nitrogen-containing aromatic compound, which enables to the manufacture of polymers endowed with proton conductivity. Said polymers can be used to manufacture proton-conductive films.

However, to the knowledge of the present Applicant, the use of membranes made from polyphenylene polymers for high-pressure filtration has never been disclosed in the art.

WO 2008/116837 (Solvay Advanced polymers, L.L.C.) discloses a fiber made with a polymer material selected from different aromatic polymers. preferred methods for the manufacture of the fibers are those wherein the starting polymer are in the melt state. Said fiber can be then incorporated into a fabric, such as for use in textile industry and aerospace, automotive, medical, military, safety, chemical, pharmaceutical and metallurgical industries. The fabric can be incorporated into a filter assembly, which can be used for industrial plants, such as electric power plants and cement plants. No example of the fibers or the fabrics as described above are provided in this patent application. Also, this patent application describes filters, not membranes, which are known to have different physical properties, notably in terms of pore size dimensions.

WO 2018/065526 (Solvay Specialty Polymers USA, LLC) discloses a polymer composition for the preparation of a porous article, notably microporous membranes or hollow fibers, and a process from a blend of at least one semi-crystalline or amorphous polymer with an additive.

Q. Shi et al. in "Poly(p-phenylene terephthalamide) embedded in a polysulfone as the substrate for improving compaction resistance and adhesion of a thin film composite polyamide membrane" J. Mater. Chem. A, 2017, 5, 13610-13624 disclose an approach for improve the compaction resistance and polyamide skin layer adhesion onto the substrate in thin film composite (TFC) membranes, which is based on in situ polymerization of p-phenylene terephthalamide (PPTA) in a polysulfone (PSf) solution prior to membrane casting via the phase inversion phase, thereby forming a PPTA-embedded PSf substrate. In brief, this article disclose a reaction for bonding PPTA to PSf, and not the physical blend of two components.

SUMMARY OF INVENTION

The Applicant thus faced the problem of providing a membrane that does not undergo to compaction when used in high-pressure filtration methods.

The Applicant also faced the problem of providing a membrane having outstanding mechanical properties, such that a membrane having low thickness can be manufactured.

Also, the Applicant faced the problem of providing a membrane showing the above mentioned properties, without the use of mineral fillers or other additives in the starting dope compositions.

Surprisingly, the Applicant found that a membrane comprising at least one porous layer obtained from a composition comprising at least one polyphenylene polymer is suitable for use in high-pressure filtration methods.

The Applicant surprisingly found that the membrane according to the present invention is capable of resisting to high pressure, without showing compaction or flux decay.

Thus, in a first aspect, the present invention relates to a method for purifying a fluid containing at least one contaminant, said method comprising the steps of
  (i) providing a fluid containing at least one contaminant;
  (ii) providing a membrane [membrane (PP)] comprising at least one porous layer [layer (PP)] comprising at least one polyphenylene polymer [polymer (PP)];
  (iii) contacting said fluid containing at least one contaminant and said membrane (PP) by applying a pressure higher than 1 bar to said fluid; and
  (iv) recovering the fluid free from said at least one contaminant.

Also, the Applicant found that membrane (PP) according to the present invention has outstanding mechanical properties, even when a membrane with thickness of about 10 micron is manufactured.

Also, the Applicant found that membrane (PP) according to the present invention has outstanding resistance to strong alkaline environment, and hence provides an advantage over membranes made from composition comprising fluorinated polymers such as polyvinylidenfluoride (PVDF), whose polymeric structure is altered until it breaks when used in strongly alkaline environments.

Advantageously, said membrane is prepared from a composition [composition (C)] comprising at least one polymer (PP) and at least one solvent [medium (L)].

Thus, in a further aspect, the present invention relates to a membrane [membrane (PP*)] comprising at least one porous layer [layer (PP*)] comprising at least one polyphenylene polymer [polymer (PP)].

Advantageously, said polymer (PP) is the only polymer, i.e. it is used alone, without the addition of further polymers.

Advantageously, said membrane (PP*) is prepared by a composition [composition (C*)] comprising at least one polyphenylene polymer [polymer (PP)] and at least one solvent [medium (L)], wherein said polymer (PP) is in an amount from 7 wt. % to less than 60 wt. %, more preferably from 8 to 55 wt. % and even more preferably from 10 to 50 wt. %, based on the weight of said composition (C*).

Indeed, the Applicant found that when said composition (C*) comprises an amount of said polymer (PP) below 7 wt. % based on the weight of said composition (C*), the porous layer obtained is too fragile for subsequent manipulation, and hence the membrane obtained therefrom does not have sufficient mechanical strength to be handled by a technician and even less to withstand under high pressure.

Also, the Applicant found that when said composition (C*) comprises an amount of said polymer (PP) of 60 wt. % or more based on the weight of said composition (C*), the polymer (PP) does not dissolve and hence it is not possible to manufacture a membrane.

In addition, membrane (PP*) according to the present invention is characterized by a tensile modulus (measured according to ASTM D638 type V) of at least 201 MPa, more preferably of from 201 to 400 MPa; and/or by a gravimetric porosity (measured according to the procedure described in Appendix of Desalination, 72, 1989, 249-262, in isopropyl alcohol) of at least 0.55, more preferably of at least 0.65 and preferably up to 0.83. According to a preferred embodiment, membrane (PP*) has a tensile modulus of at least 201 MPa and a gravimetric porosity higher than 0.65.

In addition, the Applicant found that in order to withstand a working pressure higher than 1 bar, membrane (PP*) according to the present invention must possess a combination of mechanical properties, in terms of ratio between the tensile modulus as defined above and gravimetric porosity (as defined above) of at least 243 MPa and preferably up to 365 MPa.

DESCRIPTION OF EMBODIMENTS

For the purposes of the present description:
the use of parentheses before and after symbols or numbers identifying compounds, chemical formulae or parts of formulae has the mere purpose of better distinguishing those symbols or numbers from the rest of the text and hence said parentheses can also be omitted;
the term "membrane" is intended to indicate to a discrete, generally thin, interface that moderates the permeation of chemical species in contact with it, said membrane containing pores of finite dimensions;
the term "gravimetric porosity" is intended to denote the fraction of voids over the total volume of the porous membrane;
the term "solvent" is used herein in its usual meaning, that is it indicates a substance capable of dissolving another substance (solute) to form an uniformly dispersed mixture at the molecular level. In the case of a polymeric solute, it is common practice to refer to a solution of the polymer in a solvent when the resulting mixture is transparent and no phase separation is visible in the system. Phase separation is taken to be the point, often referred to as "cloud point", at which the solution becomes turbid or cloudy due to the formation of polymer aggregates.

Membranes containing pores homogeneously distributed throughout their thickness are generally known as symmetric (or isotropic) membranes; membranes containing pores which are heterogeneously distributed throughout their thickness are generally known as asymmetric (or anisotropic) membranes.

Said membrane (PP) may be either a symmetric membrane or an asymmetric membrane.

The asymmetric porous membrane (PP) typically comprises an outer layer containing pores having an average pore diameter smaller than the average pore diameter of the pores in one or more inner layers.

The membrane (PP) preferably has an average pore diameter of at least 0.001 µm, more preferably of at least 0.005 µm, and even more preferably of at least 0.01 µm. The membrane (PP) preferably has an average pore diameter of at most 50 µm, more preferably of at most 20 µm and even more preferably of at most 15 µm.

Suitable techniques for the determination of the average pore diameter in the porous membranes of the invention are described for instance in Handbook of Industrial Membrane Technology. Edited by PORTER, Mark C. Noyes Publications, 1990. p. 70-78. Average pore diameter is preferably determined by scanning electron microscopy (SEM).

The membrane (PP) typically has a gravimetric porosity comprised between 5% and 90%, preferably between 10% and 85% by volume, more preferably between 30% and 90%, based on the total volume of the membrane.

Suitable techniques for the determination of the gravimetric porosity in membrane (PP) are described for instance by SMOLDERS, K., et al. Terminology for membrane distillation. *Desalination*. 1989, vol. 72, p. 249-262.

Membrane (PP) may be either a self-standing porous membrane comprising said layer (PP) as the only layer or a multi-layered membrane, preferably comprising said layer (PP) supported onto a substrate.

Said substrate layer may be partially or fully interpenetrated by said layer (PP).

A multi-layered membrane is typically obtained by coating said substrate with said layer (PP) or by impregnating or dipping said substrate with said composition (C) as defined above.

The nature of the substrate is not particularly limited. The substrate generally consists of materials having a minimal influence on the selectivity of the porous membrane. The substrate layer preferably consists of non-woven materials, glass fibers and/or polymeric material such as for example polypropylene, polyethylene, polyethyleneterephthalate.

In addition to the substrate, membrane (PP) can comprise an additional layer, which is preferably a coating with aromatic polyamides.

Depending on its final intended use, membrane (PP) can be flat, when flat membranes are required, or tubular in shape, when tubular or hollow fiber membranes are required.

Flat membranes are generally preferred when high fluxes are required whereas hollow fibers membranes are particularly advantageous in applications wherein compact modules having high surface areas are required.

Flat membranes preferably have a thickness comprised between 10 µm and 200 µm, more preferably between 15 µm and 150 µm.

Tubular membranes typically have an outer diameter greater than 3 mm. Tubular membranes having an outer diameter comprised between 0.5 mm and 3 mm are typically referred to as hollow fibers membranes. Tubular membranes having a diameter of less than 0.5 mm are typically referred to as capillary membranes.

Polymer (PP) preferably comprises at least about 10 mole percent (per 100 moles of polymer (PP)), more preferably at least 12 mole percent and even more preferably at least 15 mole percent, of repeating units ($R_{pm}$) represented by the following formula:

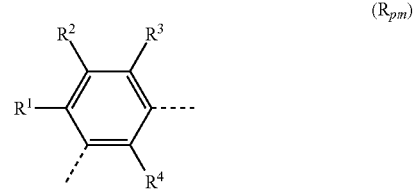

and at least about 10 mol percent repeat units ($R_{pp}$) represented by the following formula:

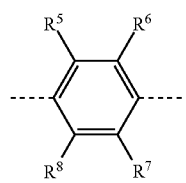

wherein $R^1, R^2, R^3, R^4, R^5, R^6, R^7,$ and $R^8$ are each independently selected from the group consisting of hydrogen, alkyl, aryl, alkoxy, aryloxy, alkylketone, arylketone, fluoroalkyl, fluoroaryl, bromoalkyl, bromoaryl, chloroalkyl, chloroaryl, alkylsulfone, arylsulfone, alkylamide, arylamide, alkylester, arylester, fluorine, chlorine, and bromine.

Preferably, one or more of $R^1, R^2, R^3,$ and $R^4$ is independently represented by formula Ar-T-, wherein Ar is represented by a formula selected from the following group of formulae:

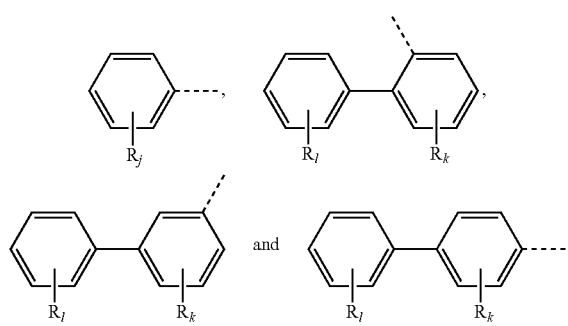

wherein each $R_j, R_k$ and $R_l$ is independently selected from the group consisting of hydrogen, halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium, with j and l, equal or different from each other, being independently 0, 1, 2, 3, 4, or 5 and, k, equal or different from j or l, being independently 0, 1, 2, 3 or 4;

T is selected from the group consisting of —$CH_2$—; —O—; —$SO_2$—; —S—; —C(O)—; —$C(CH_3)_2$—; —$C(CF_3)_2$—; —C(=$CCl_2$)—; —$C(CH_3)(CH_2CH_2COOH)$—; —N=N—; —$R^a$C=$CR^b$—, wherein each $R^a$ and $R^b$, independently of one another, is hydrogen, $C_1$-$C_{12}$-alkyl, $C_1$-$C_{12}$-alkoxy, or $C_6$-$C_{18}$-aryl group; —$(CH_2)_n$— and —$(CF_2)_n$— with n being an integer from 1 to 6; a linear or branched aliphatic divalent group having from 1 to 6 carbon atoms.

In some embodiments, one or more of $R^1, R^2, R^3,$ and $R^4$ is represented by formula:

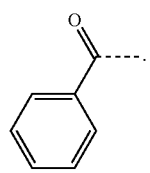

In some embodiments, the repeat unit $(R_{pm})$ is represented by the formula

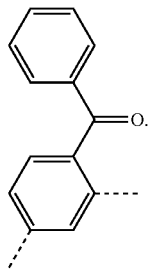

In some embodiments, the polymer (PP) comprises at least about 30 mole percent, preferably at least about 40 mole percent of repeating units $(R_{pm})$.

In some embodiments, one or more of $R^5, R^6, R^7,$ and $R^8$ is independently represented by formula Ar"-T"-, wherein Ar" is represented by a formula selected from the following group of formulae

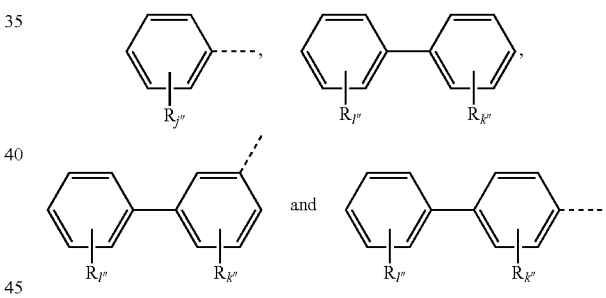

wherein each $R_{j''}, R_{k''}$ and $R_{l''}$ is independently selected from the group consisting of hydrogen, halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium, j" and l", equal or different from each other being independently 0, 1, 2, 3, 4, or 5 and, k", equal or different from j" or l", being independently 0, 1, 2, 3 or 4;

T" is selected from the group consisting of —$CH_2$—; —O—; —$SO_2$—; —S—; —C(O)—; —$C(CH_3)_2$—; —$C(CF_3)_2$—; —C(=$CCl_2$)—; —$C(CH_3)(CH_2CH_2COOH)$—; —N=N—; —$R^a$C=$CR^b$—, wherein each $R^a$ and $R^b$, independently of one another, is hydrogen, $C_1$-$C_{12}$-alkyl, $C_1$-$C_{12}$-alkoxy, or $C_6$-$C_{18}$-aryl group; —$(CH_2)_n$— and —$(CF_2)_n$— with n being an integer from 1 to 6; a linear or branched aliphatic divalent group having from 1 to 6 carbon atoms.

In some embodiments, the repeat unit ($R_{pp}$) is represented by the formula:

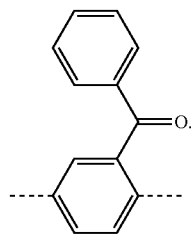

In some embodiments, the polymer (PP) comprises at least about 40 mole percent repeat units ($R_{pp}$).

In a preferred embodiment, said polymer (PP) is commercially available from Solvay Specialty Polymers, under the tradename PrimoSpire® SRP.

Said medium (L) is advantageously selected from polar aprotic solvents.

The medium (L) preferably comprises at least one organic solvent. Suitable examples of organic solvents are:
- aliphatic hydrocarbons including, more particularly, the paraffins such as, in particular, pentane, hexane, heptane, octane, nonane, decane, undecane, dodecane or cyclohexane, and naphthalene and aromatic hydrocarbons and more particularly aromatic hydrocarbons such as, in particular, benzene, toluene, xylenes, cumene, petroleum fractions composed of a mixture of alkylbenzenes;
- aliphatic or aromatic halogenated hydrocarbons including more particularly, perchlorinated hydrocarbons such as, in particular, tetrachloroethylene, hexachloroethane;
- partially chlorinated hydrocarbons such as dichloromethane, chloroform, 1,2-dichloroethane, 1,1,1-trichloroethane, 1,1,2,2-tetrachloroethane, pentachloroethane, trichloroethylene, 1-chlorobutane, 1,2-dichlorobutane, monochlorobenzene, 1,2-dichlorobenzene, 1,3-dichlorobenzene, 1,4-dichlorobenzene, 1,2,4-trichlorobenzene or mixture of different chlorobenzenes;
- aliphatic, cycloaliphatic or aromatic ether oxides, more particularly, diethyl oxide, dipropyl oxide, diisopropyl oxide, dibutyl oxide, methylterbutyl ether, dipentyl oxide, diisopentyl oxide, ethylene glycol dimethyl ether, ethylene glycol diethyl ether, ethylene glycol dibutyl ether benzyl oxide; dioxane, tetrahydrofuran (THF);
- dimethylsulfoxide (DMSO);
- glycol ethers such as ethylene glycol monomethyl ether, ethylene glycol monoethyl ether, ethylene glycol monopropyl ether, ethylene glycol monoisopropyl ether, ethylene glycol monobutyl ether, ethylene glycol monophenyl ether, ethylene glycol monobenzyl ether, diethylene glycol monomethyl ether, diethylene glycol monoethyl ether, diethylene glycol mono-n-butyl ether;
- glycol ether esters such as ethylene glycol methyl ether acetate, ethylene glycol monoethyl ether acetate, ethylene glycol monobutyl ether acetate;
- alcohols, including polyhydric alcohols, such as methyl alcohol, ethyl alcohol, diacetone alcohol, ethylene glycol;
- ketones such as acetone, methylethylketone, methylisobutyl ketone, diisobutylketone, cyclohexanone, isophorone;
- linear or cyclic esters such as isopropyl acetate, n-butyl acetate, methyl acetoacetate, dimethyl phthalate, γ-butyrolactone;
- linear or cyclic carboxamides such as N,N-dimethylacetamide (DMAc), N,N-diethylacetamide, dimethylformamide (DMF), diethylformamide or N-methyl-2-pyrrolidone (NMP);
- organic carbonates for example dimethyl carbonate, diethyl carbonate, dipropyl carbonate, dibutyl carbonate, ethylmethyl carbonate, ethylene carbonate, vinylene carbonate;
- phosphoric esters such as trimethyl phosphate, triethyl phosphate (TEP);
- ureas such as tetramethylurea, tetraethylurea;
- methyl-5-dimethylamino-2-methyl-5-oxopentanoate (commercially available under the tradename Rhodialsov Polarclean®).

Preferably, said at least one organic solvent is selected from polar aprotic solvents and even more preferably in the group consisting of: N-methyl-pyrrolidone (NMP), dimethyl acetamide (DMAc), dimethylformamide (DMF), dimethylsulfoxide (DMSO), tetrahydrofuran (THF), methyl-5-dimethylamino-2-methyl-5-oxopentanoate (commercially available under the tradename Rhodialsov Polarclean®) and triethylphosphate (TEP).

The medium (L) preferably comprises at least 40 wt. %, more preferably at least 50 wt. % based on the total weight of said medium (L), of at least one organic solvent. Medium (L) preferably comprises at most 100 wt. %, more preferably at most 99 wt. % based on the total weight of said medium (L), of at least one organic solvent.

The medium (L) may further comprise at least one non-solvent medium [medium (NS)]. The medium (NS) may comprise water.

Preferably, said fluid containing at least one contaminant is a liquid phase or a gas phase.

Said contaminant can be a solid contaminant. According to this embodiment, liquid and gas phases comprising one or more solid contaminants are also referred to as "suspensions", i.e. heterogeneous mixtures comprising at least one solid particle (the contaminant) dispersed into a continuous phase (or "dispersion medium", which is in the form of liquid or gas).

Said at least one solid contaminant preferably comprises comprising microorganisms, preferably selected from the group consisting of bacteria such as *Staphylococcus aureus* and *Pseudomonas aeruginosa*, algae, fungi, protozoa and viruses.

According to another embodiment, when saline water is the liquid phase, said contaminant is the dissolved salt content in the saline water itself. According to this embodiment, the liquid phase is an "aqueous solution", i.e. a homogeneous mixture wherein salts (the solute) are dissolved into water (the solvent).

In a preferred embodiment, the method of the present invention is a method for purifying non-drinkable water, wherein said fluid is saline water or brackish water, said contaminant is the dissolved salts content, and said membrane (PP) comprises (I) a substrate layer, (II) an outer layer consisting of aromatic polyamides and (III) a layer (PP) as defined above, said layer (PP) being interposed between said substrate layer and said outer layer.

In one embodiment, two or more membranes (PP) can be used in series for the filtration of a liquid and/or gas phase. Advantageously, a first filtration step is performed by contacting liquid and/or gas phases comprising one or more solid contaminants with a first membrane [membrane (PP1)]

having an average pore diameter higher than 5 µm, more preferably from 5 to 50 µm; and a second filtration step is performed after said first filtration step, by contacting the same liquid and/or gas phase with a second membrane [membrane (PP2)] having an average pore diameter of from 0.001 to 5 µm.

Alternatively, at least one membrane (PP) is used in series with at least one porous membrane obtained from a composition different composition (C) according to the present invention.

Preferably, said step (iii) is performed by applying a pressure of at least 2 bar, preferably of at least 4 bars. Preferably, said step (iii) is performed by applying a pressure up to 50 bar, more preferably up to 100 bar.

Membrane (PP) can be manufactured according to techniques known in the art, for example in liquid phase or in molten phase.

According to a first embodiment of the invention, the process for manufacturing a porous membrane is carried out in liquid phase.

The process according to this first embodiment preferably comprises:
(i^) providing a liquid composition [composition ($C_L$)] comprising:
  polymer (PP) as defined above, and
  a liquid medium [medium (L)] as defined above;
(ii^) processing composition ($C^L$) provided in step (i) thereby providing a film; and
(iii^) precipitating the film provided in step (ii) thereby providing a porous membrane.

Under step (i^), composition ($C^L$) is manufactured by any conventional techniques. For instance, the medium (L) may be added to polymer (PP), or, preferably, polymer (PP) may be added to the medium (L), or even polymer (PP) and the medium (L) may be simultaneously mixed.

Any suitable mixing equipment may be used. Preferably, the mixing equipment is selected to reduce the amount of air entrapped in composition ($C^L$) which may cause defects in the final membrane. The mixing of polymer (PP) and the medium (L) may be conveniently carried out in a sealed container, optionally held under an inert atmosphere. Inert atmosphere, and more precisely nitrogen atmosphere has been found particularly advantageous for the manufacture of composition ($C^L$).

Under step (i^), the mixing time during stirring required to obtain a clear homogeneous composition ($C^L$) can vary widely depending upon the rate of dissolution of the components, the temperature, the efficiency of the mixing apparatus, the viscosity of composition ($C^L$) and the like.

Under step (ii^), composition ($C^L$) is typically processed in liquid phase.

Under step (ii^), composition ($C^L$) is typically processed by casting thereby providing a film.

Casting generally involves solution casting, wherein typically a casting knife, a draw-down bar or a slot die is used to spread an even film of a liquid composition comprising a suitable medium (L) across a suitable support.

Under step (ii^), the temperature at which composition ($C^L$) is processed by casting may be or may be not the same as the temperature at which composition ($C^L$) is mixed under stirring.

Different casting techniques are used depending on the final form of the membrane to be manufactured.

When the final product is a flat membrane, composition ($C^L$) is cast as a film over a flat supporting substrate, typically a plate, a belt or a fabric, or another microporous supporting membrane, typically by means of a casting knife, a draw-down bar or a slot die.

According to a first embodiment of step (ii^), composition ($C^L$) is processed by casting onto a flat supporting substrate to provide a flat film.

According to a second embodiment of step (ii^), composition ($C^L$) is processed to provide a tubular film.

According to a variant of this second embodiment of step (ii^), the tubular film is manufactured using a spinneret.

The term "spinneret" is hereby understood to mean an annular nozzle comprising at least two concentric capillaries: a first outer capillary for the passage of composition ($C^L$) and a second inner one for the passage of a supporting fluid, generally referred to as "lumen".

Hollow fibers and capillary membranes may be manufactured by the so-called spinning process according to this variant of the second embodiment of step (ii^). According to this variant of the second embodiment of the invention, composition ($C^L$) is generally pumped through the spinneret. The lumen acts as the support for the casting of composition ($C^L$) and maintains the bore of the hollow fiber or capillary precursor open. The lumen may be a gas, or, preferably, a medium (NS) or a mixture of the medium (NS) with a medium (L). The selection of the lumen and its temperature depends on the required characteristics of the final membrane as they may have a significant effect on the size and distribution of the pores in the membrane.

At the exit of the spinneret, after a short residence time in air or in a controlled atmosphere, under step (iii^) of the process for manufacturing a porous membrane according to this first embodiment of the invention, the hollow fiber or capillary precursor is precipitated thereby providing the hollow fiber or capillary membrane.

The supporting fluid forms the bore of the final hollow fiber or capillary membrane.

Tubular membranes, because of their larger diameter, are generally manufactured using a different process from the one employed for the production of hollow fiber membranes.

The Applicant has found that use of solvent/non-solvent mixtures at a given temperature, in any one of steps (ii^) and (iii^) of the process according to the invention, advantageously allows controlling the morphology of the final porous membrane including its average porosity.

The temperature gradient between the film provided in any one of steps (ii^) and (iii^) of the process according to the first embodiment of the invention and the medium (NS) may also influence the pore size and/or pore distribution in the final porous membrane as it generally affects the rate of precipitation of the polymer (A) from composition ($C^L$).

According to a second embodiment of the invention, the process for manufacturing a porous membrane is carried out in molten phase.

The process according to the second embodiment of the invention preferably comprises the following steps:
(i^^) providing a solid composition [composition ($C^S$)] comprising at least one polymer (PP) as defined above;
(ii^^-A) processing the composition ($C^S$) provided in step (i^^) thereby providing a film and (iii^^-A) stretching the film provided in step (ii^^-A) thereby providing a porous membrane; or
(ii^^-B) processing the composition ($C^S$) provided in step (i^^) thereby providing fibers and (iii^^-B) processing the fibers provided in (ii^^-B) thereby providing a porous membrane.

Under step (ii^^-A), composition ($C^S$) is preferably processed in molten phase.

Melt forming is commonly used to make dense films by film extrusion, preferably by flat cast film extrusion or by blown film extrusion.

According to this technique, composition ($C^S$) is extruded through a die so as to obtain a molten tape, which is then calibrated and stretched in the two directions until obtaining the required thickness and wideness. Composition ($C^S$) is melt compounded for obtaining a molten composition. Generally, melt compounding is carried out in an extruder. Composition ($C^S$) is typically extruded through a die at temperatures of generally lower than 250° C., preferably lower than 200° C. thereby providing strands which are typically cut thereby providing pellets.

Twin screw extruders are preferred devices for accomplishing melt compounding of composition ($C^S$).

Films can then be manufactured by processing the pellets so obtained through traditional film extrusion techniques. Film extrusion is preferably accomplished through a flat cast film extrusion process or a hot blown film extrusion process. Film extrusion is more preferably accomplished by a hot blown film extrusion process.

Under step (iii^^-A), the film provided in step (ii^^-A) may be stretched either in molten phase or after its solidification upon cooling.

The porous membrane obtainable by the process of the invention is typically dried, preferably at a temperature of at least 30° C.

Drying can be performed under air or a modified atmosphere, e.g. under an inert gas, typically exempt from moisture (water vapour content of less than 0.001% v/v). Drying can alternatively be performed under vacuum.

As used within the present description, "composition (C)" is intended to include both the liquid composition [composition ($C^L$)] and the solid composition [composition ($C^S$)], unless otherwise specified.

According to a preferred embodiment, composition (C) is free of plasticizer agents, i.e. plasticizer agents are not added to composition (C) or they are present in an amount of less than 1 wt. %, more preferably less than 0.1 wt. % based on the total weight of said composition (C).

Preferably, said composition ($C^L$) comprises said polymer (PP) in an amount of from 7 to less than 60 wt. %, more preferably from 8 to 55 wt. % and even more preferably from 10 to 50 wt. %, based on the total weight of said composition ($C^L$).

Preferably, said composition ($C^L$) comprises said medium (L) in an amount of 40 wt. % or higher, more preferably of at least 45 wt. % and even more preferably of at least 50 wt. % based on the total weight of said composition ($C^L$). Preferably, said composition ($C^L$) comprises said medium (L) in an amount up to 93 wt. %, more preferably of 92 wt. % and even more preferably of 90 wt. % based on the total weight of said composition ($C^L$).

Preferably, said composition ($C^S$) comprises said polymer (PP) in an amount of from 1 to 85 wt. % based on the total weight of said composition ($C^S$).

A preferred embodiment of membrane (PP) according to the present invention is the embodiment referred to as membrane (PP*)).

Preferably, composition (C*) has the features described above for composition ($C^L$).

Should the disclosure of any patents, patent applications, and publications which are incorporated herein by reference conflict with the description of the present application to the extent that it may render a term unclear, the present description shall take precedence.

The invention will be herein after illustrated in greater detail by means of the Examples contained in the following Experimental Section; the Examples are merely illustrative and are by no means to be interpreted as limiting the scope of the invention.

Experimental Section

Raw Materials

Dimethylacetamide (DMAC), N-Methyl pirrolidone (NMP), isopropyl alcohol (IPA) and PolyVinyl Pirrolidone (PVP) K10 were obtained from Sigma Aldrich.

Veradel® 3000P (polyethersulfone—PESU) and Primospire® PR 250 (polyphenylene) were obtained from Solvay Specialty Polymers.

Methods

Mechanical (Tensile) Test on Flat Sheet Membranes

Mechanical properties on flat sheet porous membranes were assessed at room temperature (23° C.) following ASTM norm D638 type V, with a Grip distance=25.4 mm, and initial length $L_0$=21.5 mm. Velocity was between 1 and 50 mm/min.

The samples stored in water were took out from the container boxes and immediately tested to determine apparent modulus and stress at break.

Mechanical (Tensile) Test on Hollow Fiber Membranes

All the tests on the extruded fibers were performed following the ASTM D3032 method with an initial length $L_0$=125 mm and velocity of 125 mm/min.

All the tested fibers were stored in water without any supplementary treatment. During the tests the fibers were maintained wet: each test involved at least four-five iterations on several fiber specimens. Apparent modulus and stress at break were determined.

Measurement of Porosity and Pore Sizes

Gravimetric porosity of the membrane is defined as the volume of the pores divided by the total volume of the membrane. The porosities were measured using IPA (isopropyl alcohol) as wetting fluid according to the procedure described in Appendix of Desalination, 72 (1989) 249-262.

$$\varepsilon = \frac{\frac{(\text{Wet} - \text{Dry})}{\rho_{liquid}}}{\frac{(\text{Wet} - \text{Dry})}{\rho_{liquid}} - \frac{\text{Dry}}{\rho_{polymer}}}$$

where

Wet is the weight of the wetted membrane,

Dry is the weight of dry membrane, $\rho_{polymer}$ is the density of the polymer, (1.19 g/cm³ PrimoSpire®; 1.36 g/cm³ of PESU) and $\rho_{liquid}$ is the density of IPA (0.78 g/cm³).

Measurement of Water Permeability

The pure water permeability was measured according to the technique known in the art. Water flux (J) through each membrane at given pressure, was defined as the volume which permeates per unit area and per unit time. The flux is calculated by the following equation:

$$J = \frac{V}{A \Delta t}$$

where V (L) is the volume of permeate, A is the membrane area, and Δt is the operation time.

Water flux measurements on flat sheet membranes were conducted at room temperature using a dead-end configuration under a constant nitrogen.

Flux Decay Tests ("Compaction Tests")

This test was performed to assess the propensity of the produced items to pressure compaction. This test was performed only on some selected flat sheet items and consists in measuring the flux (as defined above) for prolonged times (about 45 minutes) for each of three pre-determined consecutive steps at 1-2 and 4 bar of applied pressure. The first flux measurement at 1 bar was performed after roughly 11 minutes of holding the pressure. The entire test lasted for 135 minutes. At the end, it was possible to assess the flux decay during the duration of each pressure step and also check the eventual proportionality between flux and applied pressure.

Preparation of Dope Solutions

Solutions were prepared at 30° C., by adding the amount of polymer detailed in the examples that follows and optional additives in the solvent (DMAC or NMP as detailed below) and stirring with a mechanical anchor for several hours until a clear and homogeneous system for each solution was obtained. When necessary, the temperature of the system was raised to 50° C.-60° C. in order to speed up the dissolution process.

Preparation of Membranes in the Form of Flat Sheet

Porous membranes in the form of flat sheets were prepared by filming the dope solution prepared as described above over a suitable smooth glass support, by means of an automatized casting knife.

Membrane casting was performed by holding the dope solution, the casting knife and the support temperatures at 25° C., so as to prevent premature precipitation of the polymer. The knife gap was set at 250 µm. After casting, polymeric films were immediately immersed in a coagulation bath (either of pure de-ionized water or a mixture IPA/water 50:50 v/v) in order to induce phase inversion.

After coagulation the membranes were washed several times in pure water in the following days to remove residual traces of solvent.

Preparation of Membranes in the Form of Hollow Fibers

Porous membranes in the form of hollow fibers were prepared by extruding the dope solution, prepared as detailed above, through a spinneret (3 in FIG. 1).

Hollow fibers were prevented from collapsing by coextruding water as bore fluid in the center of the annulus, which was fed at a flow rate ranging from 1-10 ml/min.

The rotating (coagulation) water bath (6 in FIG. 1) enabled producing coagulation by phase inversion. The temperature of the apparatus was controlled by a PID system. The spinneret geometry used in the extrusion part had an internal diameter (IDsp) of 800 µm, an external one of 1600 µm (ODsp) and a bore diameter of 300 µm (indicated later in the text as 0.3-0.8-1.6).

Example 1

Porous membranes according to the invention in the form of flat sheets were prepared using DMAC solvent and Primospire® PR-250 in the following concentrations: 15%, 20% and 25% w/w.

(a) The nascent membrane was coagulated in water.
(b) the nascent membrane was coagulated in a blend of 50/50 v/v IPA/water.

Example 1C

As comparison, porous membranes in the form of flat sheets were prepared using DMAC solvent and Veradel® PESU (polyethersulfone) 3000 MP in the following concentrations: 15% and 20% w/w.

(a) The nascent membrane was coagulated in water.
(b) the nascent membrane was coagulated in a blend of 50/50 v/v IPA/water.

The mechanical properties for the membranes obtained are shown in the following Table 1.

TABLE 1

| | Example1 | | Example 1C(*) | |
|---|---|---|---|---|
| | (a) | (b) | (a) | (b) |
| | Concentration = 15% w/w | | | |
| Modulus (MPa) | 201 | 317 | 100 | 147 |
| Stress at break (MPa) | 9.9 | 12.8 | 5.0 | 6.5 |
| Porosity | 0.824 | 0.796 | 0.815 | 0.780 |
| | Concentration = 20% w/w | | | |
| Modulus (MPa) | 380 | 549 | 141 | 175 |
| Stress at break (MPa) | 12.4 | 17.5 | 7.3 | 8.2 |
| Porosity | 0.764 | 0.727 | 0.780 | 0.731 |
| | Concentration = 25% w/w | | | |
| Modulus (MPa) | 529 | 630 | — | — |
| Stress at break (MPa) | 16.5 | 19.6 | — | — |
| Porosity | 0.713 | 0.672 | — | — |

(*)comparison

The results in Table 1 show that the membranes prepared according to the invention had improved mechanical properties.

Compaction test was performed using membranes prepared according to Example 1 method (a) with concentration 15% w/w and Example 1C(*) method (a) with concentration 15% w/w. The results are shown in the following Table 2.

TABLE 2

| Applied pressure (bar) | Time (min) | Example 1 Flux/(initial flux at 1 bar) | Example 1C(*) Flux/(initial flux at 1 bar) |
|---|---|---|---|
| 1 | 11 | 1.00 | 1.00 |
| 1 | 21 | 0.95 | 0.90 |
| 1 | 31 | 0.95 | 0.84 |
| 1 | 41 | 0.93 | 0.79 |
| 2 | 56 | 1.80 | 1.25 |
| 2 | 66 | 1.74 | 1.16 |
| 2 | 76 | 1.71 | 1.09 |
| 2 | 86 | 1.67 | 1.06 |
| 4 | 101 | 3.34 | 1.59 |
| 4 | 111 | 3.17 | 1.51 |
| 4 | 121 | 3.05 | 1.44 |
| 4 | 131 | 2.95 | 1.38 |

(*)comparison

The above results showed that the membrane prepared according to the invention retained a better flux at each pressure step and notably at 2 bar and above, and that, as pressure increased, a proportionality between flux and pressure was maintained. On the contrary, as pressure increased, the flux measured for the comparative membrane was strongly affected by pressure compaction.

Example 2

Porous membranes according to the invention in the form of flat sheets were prepared using DMAC solvent and a blend comprising 5% w/w of PVP K10 and 20% w/w Primospire® PR-250.
(a) The nascent membrane was coagulated in water.
(b) the nascent membrane was coagulated in a blend of 50/50 v/v IPA/water.

Example 2C

As comparison, porous membranes in the form of flat sheets were prepared using DMAC solvent and a blend comprising of 5% w/w of PVP K10 and 20% w/w Veradel® PESU (polyethersulfone) 3000 MP.
(a) The nascent membrane was coagulated in water.
(b) the nascent membrane was coagulated in a blend of 50/50 v/v IPA/water.

The mechanical properties for the membranes obtained are shown in the following Table 3.

TABLE 3

|  | Example 2 | | Example 2C(*) | |
| --- | --- | --- | --- | --- |
|  | (a) | (b) | (a) | (b) |
|  | Concentration = 20% w/w | | | |
| Modulus (MPa) | 210 | 302 | 71 | 119 |
| Stress at break (MPa) | 8.3 | 12.1 | 3.4 | 6.7 |
| Porosity | 0.81 | 0.78 | 0.82 | 0.77 |

(*)comparison

The results in Table 3 showed that the membranes prepared according to the invention had improved mechanical properties.

Compaction test was performed using membranes prepared according to Example 2 method (a) and Example 2C(*) method (a). The results are shown in the following Table 4.

TABLE 4

| Applied pressure (bar) | Time (min) | Example 2 Flux/(initial flux at 1 bar) | Example 2C(*) Flux/(initial flux at 1 bar) |
| --- | --- | --- | --- |
| 1 | 11 | 1.00 | 1.00 |
| 1 | 21 | 1.00 | 0.97 |
| 1 | 31 | 0.97 | 0.94 |
| 1 | 41 | 0.96 | 0.93 |
| 2 | 56 | 1.94 | 1.71 |
| 2 | 66 | 1.89 | 1.69 |
| 2 | 76 | 1.86 | 1.65 |
| 2 | 86 | 1.83 | 1.61 |
| 4 | 101 | 3.56 | 2.25 |
| 4 | 111 | 3.47 | 1.96 |
| 4 | 121 | 3.39 | 1.79 |
| 4 | 131 | 3.34 | 1.66 |

(*)comparison

The above results showed that the membrane prepared according to the invention retained a better flux at each pressure step and notably at 2 bar and above, and that, as pressure increased, a proportionality between flux and pressure was maintained. On the contrary, as pressure increased, the flux measured for the comparative membrane was strongly affected by pressure compaction.

Example 3

Porous membranes according to the invention in the form of hollow fibers were prepared using DMAC solvent and 25% w/w Primospire® PR-250.

Example 3C

As comparison, porous membranes in the form of hollow fibers were prepared using DMAC solvent and 25% w/w Veradel® PESU 3000 MP (polyethersulfone).

The experimental conditions for the preparation of the membranes of Example 3 and Example 3C were the following:
dope composition/T° C. extrusion: 25 wt. %/30° C.
nozzle (mm): 0.3-0.8-1.6
bore fluid: pure water
coagulation bath temperature: water at 25° C.
ratio of Dope throughput (g/min) to Bore throughput (D/B ratio): 0.6-3.5
air gap: 9 cm The mechanical properties for the membranes obtained are shown in the following Table 5.

TABLE 5

|  | Example 3 | Example 3C(*) |
| --- | --- | --- |
| Modulus (MPa) | 320 | 215 |
| Stress at break (MPa) | 18 | 11 |
| Porosity (%) | 0.73 | 0.61 |

(*)comparison

The results in Table 5 showed that the membranes prepared according to the invention had improved mechanical properties.

Examples 4C

Porous membranes in the form of flat sheet was prepared using DMAC solvent and PrimoSpire® PR250 5% w/w.
The membrane was coagulated in water.
The membrane thus obtained showed no mechanical integrity upon handling and hence it was not possible to measure its mechanical properties.

Example 5C

A composition comprising DMAC solvent and PrimoSpire® PR250 60% w/w was prepared.
From the abovementioned composition, it was not possible to cast film a membrane. Indeed, either using a magnetic or a mechanical stirrer and heating up to 130° C., it was not possible to dissolve the PrimoSpire® PR250 polymer into the DMAC solvent.

The invention claimed is:
1. A method for purifying a fluid containing at least one contaminant, said method comprising the steps of
   (i) providing a fluid containing at least one contaminant;
   (ii) providing a flat membrane [membrane (PP)] comprising at least one porous layer [layer (PP)] comprising at least one polyphenylene polymer [polymer (PP)];
   contacting said fluid containing at least one contaminant and said membrane (PP) by applying a pressure higher than 1 bar to said fluid; and
   (iv) recovering the fluid free from said at least one contaminant;

wherein said polymer (PP) comprises at least about 10 mole percent (per 100 moles of polymer (PP)) of repeating units ($R_{pm}$) represented by the following formula:

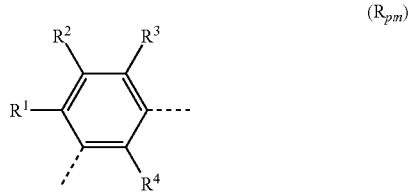

and at least about 10 mol percent repeat units ($R_{pp}$) represented by the following formula:

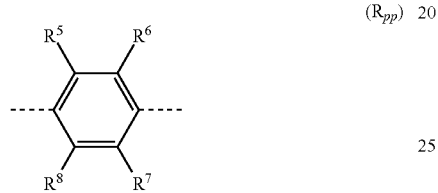

wherein $R^1$, $R^2$, $R^3$, $R^4$, $R^5$, $R^6$, $R^7$, and $R^8$ are independently selected from the group consisting of hydrogen, alkyl, aryl, alkoxy, aryloxy, alkylketone, arylketone, fluoroalkyl, fluoroaryl, bromoalkyl, bromoaryl, chloroalkyl, chloroaryl, alkylsulfone, arylsulfone, alkylamide, arylamide, alkylester, arylester, fluorine, chlorine, and bromine,
and
wherein said flat membrane is characterized by:
a tensile modulus (measured according ASTM D638 type V) of at least 201 MPa;
a gravimetric porosity of at least 0.55; and
a ratio between the tensile modulus and the gravimetric porosity of at least 243 MPa.

2. The method according to claim 1, wherein said membrane (PP) comprises said layer (PP) as the only layer or said membrane (PP) is a multi-layered membrane.

3. The method according to claim 1, wherein one or more of $R^1$, $R^2$, $R^3$, and $R^4$ is independently represented by formula Ar-T-,
wherein
Ar is represented by a formula selected from the following group of formulae:

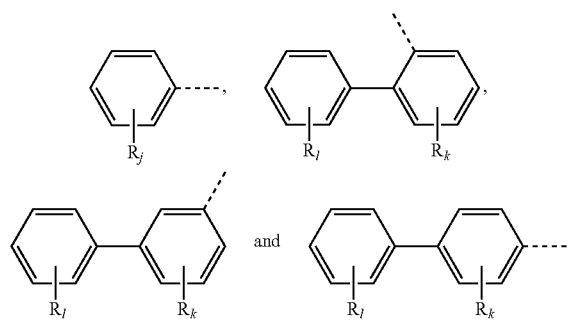

wherein
each $R_j$, $R_k$ and $R_l$ is independently selected from the group consisting of hydrogen, halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium,
with j and l, equal or different from each other, being independently 0, 1, 2, 3, 4, or 5 and,
k, equal or different from j or l, being independently 0, 1, 2, 3 or 4;
T is selected from the group consisting of —$CH_2$—; —O—; —$SO_2$—; —S—; —C(O)—; —$C(CH_3)_2$—; —$C(CF_3)_2$—; —C(=$CCl_2$)—; —$C(CH_3)$ ($CH_2CH_2COOH$)—; —N=N—; —$R^a$C=$CR^b$—,
wherein
each $R^a$ and $R^b$, independently of one another, is hydrogen, $C_1$-$C_{12}$-alkyl, $C_1$-$C_{12}$-alkoxy, or $C_6$-$C_{18}$-aryl group; —$(CH_2)_n$— and —$(CF_2)_n$— with n being an integer from 1 to 6; a linear or branched aliphatic divalent group having from 1 to 6 carbon atoms.

4. The method according to claim 3, wherein one or more of $R^1$, $R^2$, $R^3$, and $R^4$ is represented by the formula:

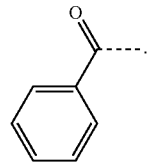

5. The method according to claim 1, wherein the repeat unit ($R_{pm}$) is represented by the formula:

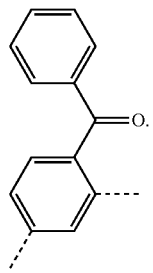

6. The method according to claim 1, wherein said polymer (PP) comprises at least about 30 mole percent of repeating units ($R_{pm}$).

7. The method according to claim 1, wherein one or more of $R^5$, $R^6$, $R^7$, and $R^8$ is independently represented by formula Ar"-T"-,
wherein
Ar" is represented by a formula selected from the following group of formulae

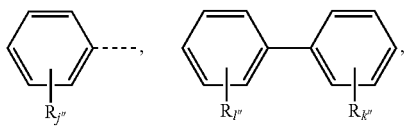

-continued

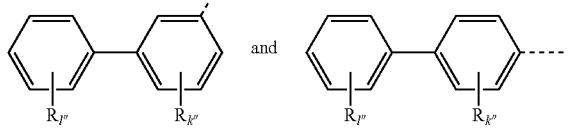

wherein
each $R_j''$, $R_k''$ and R" is independently selected from the group consisting of hydrogen, halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium, j" and i", equal or different from each other being independently 0, 1, 2, 3, 4, or 5 and, k", equal or different from j" or l", being independently 0, 1, 2, 3 or 4;

T" is selected from the group consisting of —CH$_2$—; —O—; —SO$_2$—; —S—; —C(O)—; —C(CH$_3$)$_2$—; —C(CF$_3$)$_2$—; —C(=CCl$_2$)—; —C(CH$_3$)(CH$_2$CH$_2$COOH)—; —N=N—; —R$^a$C=CR$^b$—, wherein each R$^a$ and R$^b$, independently of one another, is hydrogen, C$_1$-C$_{12}$-alkyl, C$_1$-C$_{12}$-alkoxy, or C$_6$-C$_{18}$-aryl group; —(CH$_2$)$_n$— and —(CF$_2$)$_n$— with n being an integer from 1 to 6; a linear or branched aliphatic divalent group having from 1 to 6 carbon atoms.

8. The method according to claim 1, wherein the repeat unit ($R_{pp}$) is represented by the formula:

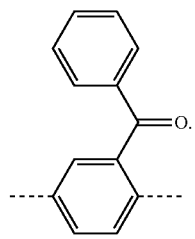

9. The method according to claim 1, wherein said polymer (PP) comprises at least about 40 mole percent repeat units ($R_{pp}$).

10. The method according to claim 1, wherein said method is for purifying non-drinkable water, said fluid is saline water or brackish water, said contaminant is the salts content dissolved into said fluid, and said membrane (PP) is a multi-layered membrane comprising (I) a substrate layer, (II) an outer layer consisting of aromatic polyamides and (III) the layer (PP), said layer (PP) being interposed between said substrate layer and said outer layer.

11. The method according to claim 1, wherein said fluid containing at least one contaminant is a liquid phase or a gas phase.

12. The method according to claim 1, wherein said membrane (PP) is obtained from a liquid composition [composition ($C^L$)] comprising said polymer (PP) in an amount of from 7 to less than 60 wt. % based on the total weight of said composition ($C^L$) or a solid composition [composition ($C^S$)] comprising said polymer (PP) in an amount of from 1 to 85 wt. % based on the total weight of said composition ($C^S$).

13. The method according to claim 1, wherein the flat membrane has a thickness between 10 μm and 200 μm.

14. A flat membrane [membrane (PP*)] comprising at least one porous layer [layer (PP*)] obtained from a composition [composition (C*)] comprising at least one polyphenylene polymer [polymer (PP)] and at least one solvent [medium (L)], wherein said polymer (PP) is in an amount from 7 wt. % to less than 60 wt. % based on the weight of said composition (C*);

wherein said polymer (PP) comprises at least about 10 mole percent (per 100 moles of polymer (PP)) of repeating units ($R_{pm}$) represented by the following formula:

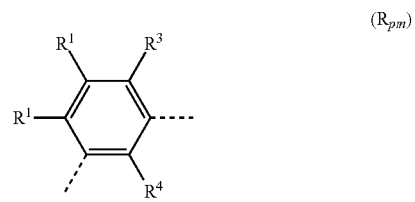

and at least about 10 mol percent repeat units ($R_{pp}$) represented by the following formula:

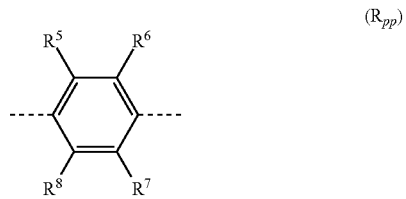

wherein $R^1$, $R^2$, $R^3$, $R^4$ $R^5$, $R^6$, $R^1$, and $R^8$ are each independently selected from the group consisting of hydrogen, alkyl, aryl, alkoxy, aryloxy, alkylketone, arylketone, fluoroalkyl, fluoroaryl, bromoalkyl, bromoaryl, chloroalkyl, chloroaryl, alkylsulfone, arylsulfone, alkylamide, arylamide, alkylester, arylester, fluorine, chlorine, and bromine, wherein said flat membrane is characterized by:
a tensile modulus (measured according to ASTM D638 type V) of at least 201 MPa;
a gravimetric porosity of at least 0.55;
a ratio between the tensile modulus and the gravimetric porosity of at least 243 MPa.

15. The membrane of claim 14, having a thickness between 10 μm and 200 μm.

* * * * *